Figure 4:
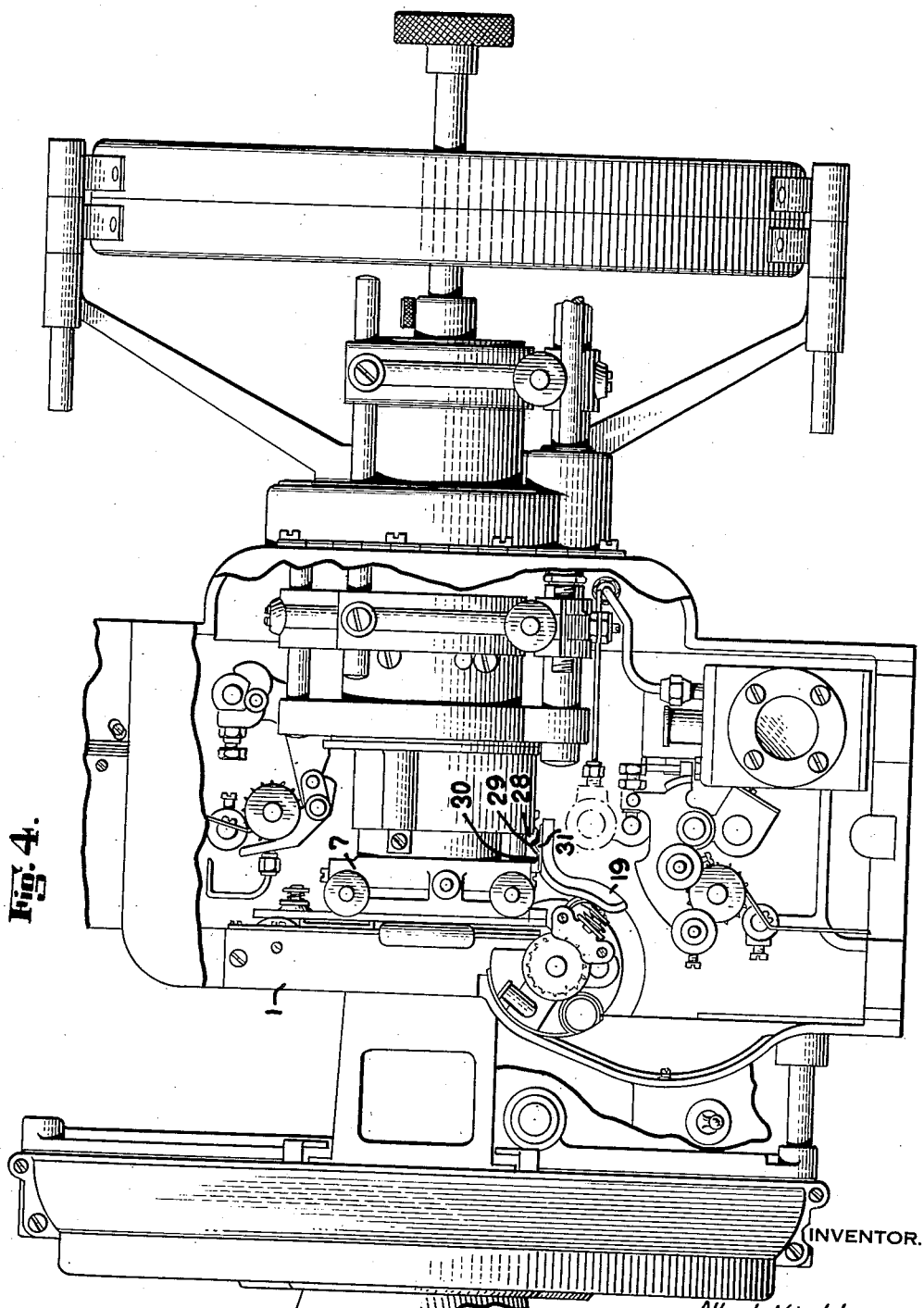

April 1, 1941.                A. KINDELMANN                2,236,878
           ACTUATING AND ADJUSTING MEANS FOR A FILM GATE ASSEMBLY
                   Filed Aug. 5, 1938        2 Sheets-Sheet 1
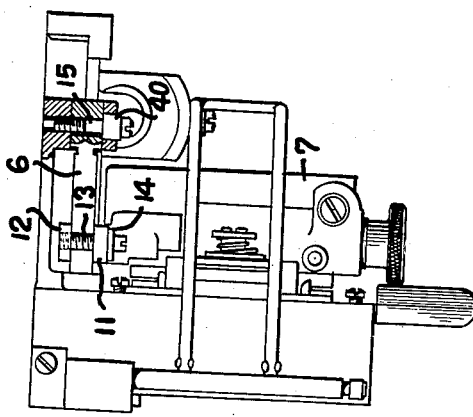
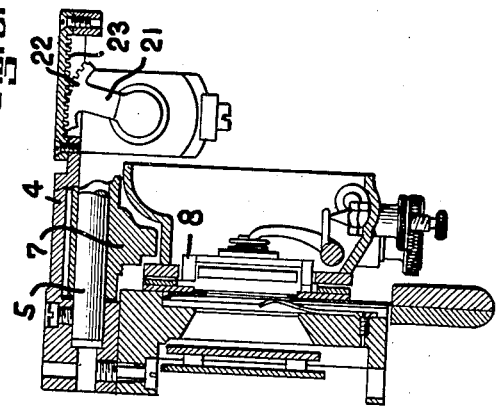
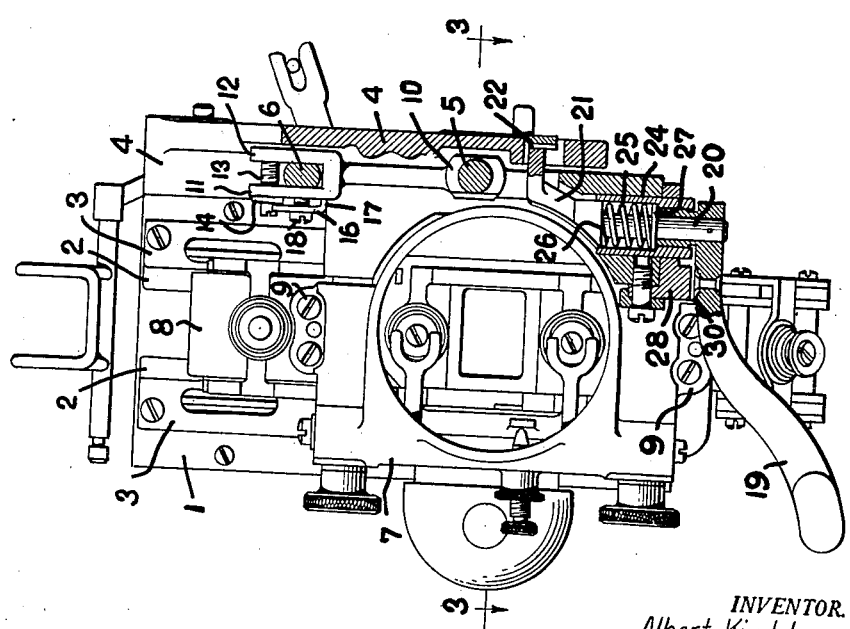
INVENTOR.
Albert Kindelmann
BY Hastings W. Baker
ATTORNEY April 1, 1941. A. KINDELMANN 2,236,878
ACTUATING AND ADJUSTING MEANS FOR A FILM GATE ASSEMBLY
Filed Aug. 5, 1938 2 Sheets-Sheet 2

INVENTOR.
Albert Kindelmann
by Hastings W. Baker
ATTORNEY

Patented Apr. 1, 1941

2,236,878

UNITED STATES PATENT OFFICE 2,236,878

ACTUATING AND ADJUSTING MEANS FOR A FILM GATE ASSEMBLY

Albert Kindelmann, Floral Park, N. Y., assignor to International Projector Corporation, New York, N. Y., a corporation of Delaware Application August 5, 1938, Serial No. 223,194

14 Claims. (Cl. 88—17)

One of the objects of this invention is to provide a new and improved means of moving the film gate assembly toward or away from the film trap.

Another object of the invention is to lock the film gate assembly in position where the film gate contacts the film trap as well as to lock it in its position when it has been fully moved away from the film trap.

Another object of the invention is to provide means whereby the film gate will be held against wobble regardless of the length of service or the amount of wear to which it has been subjected.

Another object of the invention is to provide for adjustments for wear of the bearings on which the film gate assembly is mounted.

With my improved construction the operator is enabled to thread the film between the film trap and the film gate much more easily than heretofore and at a saving of much time. It enables him to get a more accurate threading of the film and gives him more time to watch his screen and attend to the maintenance of the projector. Other objects and advantages of the invention will appear in the detailed specification and claims which follow.

The invention may be better understood by referring to the attached drawings forming a part thereof in which—

Fig. 1 is a view of the film gate assembly looking toward the rear of the projector, Fig. 2 is a top plan view of the structure shown in Fig. 1, Fig. 3 is a cross sectional view taken on the line 3—3 of Fig. 1, looking downwardly or in the direction of the arrows, and Fig. 4 is a side elevational view of the right hand side of the projector showing the position therein of the mechanism shown in Figs. 1 to 3 inclusive.

The film trap 1 is secured to the frame of the projector and is provided with film tracks 2 and guide plates 3, the film extending between the guide plates and moving on the tracks 2. A plate 4 is also secured to the projector, which plate has a round rod 5 and a rod 6 secured thereto, the rod 6 having flat side faces, except at one end where it is circular in cross section. These rods have a polished surface so that the film gate assembly may readily slide thereon.

The film gate carrier 7 has the film gate 8 secured thereto by means of screws 9, which carrier 7 is provided with a bearing 10 slidable on the rod 5. It also has two upstanding arms 11 and 12, the arm 11 contacting one of the flat faces of the rod 6 and the arm 12 contacting the other flat face thereof. A screw 13 passes through the upper extremities of the said arms, the arm 12 being threaded to receive the threads on the screw and the screw being provided with a head 14 contacting the outer face of the arm 11. The screw 13 is above the rod 6 and therefore if we tighten the screw, we bring the two arms 11 and 12 into closer contact with the side faces of the rod 6. A headed screw 15 passes through a one-fourth round face bushing 40 in the plate 4 which bushing bears against the circular part of the rod 6 so that by loosening the screw 15 the rod 6 may be turned slightly so that its flat faces may be adjusted relative to the faces of the arms 11 and 12. The screw 15 holds the rod 6 against longitudinal movement. A J-shaped spring 16 is provided with a foot 17 which contacts the lower end of the arm 11 and at its other end it overlies the head 14 of the screw 13. A screw 18 passes through the center portion of the said spring and through the arm 11. In case the bearing surfaces between the arm 11 and the rod 6 should wear, it is obvious that by adjusting the screw 13 inwardly we could compensate for that wear. The spring 16 overlying the outer surface of the head 14 tends to prevent the screw 13 from being rotated or working loose when the screw 18 is tightened.

Since the film gate is secured to the carrier, the parts are, of course, movable as a unit and I have provided means to move them toward or away from the film trap. This means consists of a lever 19 which the operator would grasp and would shift rearwardly or forwardly as viewed in Fig. 4, or toward or away from the operator as viewed in Fig. 1. This lever is secured to a shaft 20 which in turn is secured to a lever 21 carrying a segmental gear 22 which engages a rack 23 secured to the plate 4. The shaft 20 is carried in a boss 24 of the carrier 7. A spring 25 is coiled around the shaft 20 and is interposed between a shoulder 26 at the lower end of the lever 21, and a stop collar 27 resting on a shoulder of the boss 24.

The carrier 7 is provided with a plate 28 which is provided with two notches 29. The lever 19 is provided with a plate 30 which has a V-shaped projection 31 thereon forming a part thereof which is adapted to be received in either of the notches 29. In Fig. 4 the projection 31 is extending partly in the rear notch 29 and the film gate assembly has been moved toward the rear of the projector so that the film gate is contacting the film trap. The parts would be in this position when the machine was being operated to project a picture. When, however, it is desired to move the film gate assembly to the right as viewed in Fig. 4 so as to separate the film gate from the film trap so that the film might be threaded through the same, the operator would grasp the lever 19 and move it from the position shown in Fig. 4 until the projection 31 carried by the lever was received in the forward notch 29. Inasmuch as the pivot point for the said lever 19 is really the point of contact between the segmental gear 22 and the rack 23, the shaft 20 will be moved forwardly, thereby carrying the carrier 4 and the film gate and this movement is accentuated or increased by providing the gear and rack connection; that is, the movement would be greater than if the lever 21 were simply pivoted in, for instance, a recess in the plate 4. After the film is properly threaded, the lever 19 should, of course, be returned to the position shown in Fig. 4. The spring 25 permits the shaft 20 to be moved downwardly when the lever 19 is being shifted so as to allow the projector 31 to move out of the notch in which it has been resting.

It is, therefore, apparent that the projectionist can shift the film gate readily and quickly so that he can obtain easy access to the film trap and can accurately thread the film thereon. This gives the operator more time to watch his screen and to attend to his other duties. The V-shaped notches and the projection 31 serve as a locking means to hold the film gate in contact with the film trap or disengaged therefrom. When the film gate is in contact with the film trap it is held in engagement therewith which serves as a means to exclude air passing between the film gate and the guide plates 3 of the film trap which would decrease the possibility of fire by cutting off the oxygen. The screw 13 serves as a means to adjust the arms 11 and 12 toward the flat faces of the rod 6 and the screw 18 serves as a means to prevent the screw 13 being rotated when the screw 18 is screwed down. Furthermore, the screw 13 and the two arms serve as a means to hold the film gate in vertical alignment with the film trap. It also serves as a means to prevent flutter in case the parts have become worn, for obviously the film gate could not flutter if the arms 11 and 12 abut against the opposite side faces of the rod 6.

Attention is called to the fact that when the film gate has been shifted as far as possible to the left as viewed in Fig. 4 so that it is in contact with the film trap, the projection 31 does not extend to the bottom of the notch 29. As is shown in Fig. 4 the projection 31 is bearing on the bevelled edge of the notch 29 to the right of the projection and of course the lever 19 is being urged upwardly by the spring 25. The lever 19 is therefore being urged to the left as viewed in Fig. 4 and therefore the connections between the said lever and film gate urge the film gate into a tight but resilient contact with the film trap.

I realize that many changes may be made in the specific form of the invention shown by way of illustration in this application and I, therefore, desire to claim the same broadly reserving to myself the right to make all changes which may fairly fall within the scope of the appended claims.

Having now described my invention, I claim:

1. In a moving picture machine, a film trap, a film gate assembly movable toward or away from said film trap, two rods on which said assembly is slidable and means coacting with one of said rods to compensate for wear between that rod and said assembly, said means consisting of two arms on opposite sides of said last named rod, said arms forming a part of said assembly, a headed screw loosely passing through one of said arms and having the head of the screw in engagement with the outer surface of said arm and having threaded engagement with the other arm so that by rotating the screw the two arms may be accurately adjusted relative to their rod and means to prevent said screw from rotating.

2. In a moving picture machine, a film trap, a film gate assembly movable toward or away from said film trap, two rods on which said assembly is slidable, said assembly being provided with two arms straddling one of said rods and means to move the free ends of said arms toward each other to cause said arms to engage the opposite sides of the rod which they straddle.

3. In a moving picture machine, a film trap, a film gate assembly movable toward or away from said film trap, two rods on which said assembly is slidable, said assembly being provided with two arms straddling one of said rods and a screw to move the free ends of said arms toward each other to cause said arms to engage the opposite sides of the rod which they straddle.

4. In a moving picture machine, a film trap, a film gate assembly movable toward or away from said film trap, two rods on which said assembly is slidable, said assembly being provided with two arms straddling one of said rods, a screw to move the free ends of said arms toward each other to cause said arms to engage the opposite sides of the rod which they straddle, and means which when set will tend to prevent said screw from rotating.

5. In a moving picture machine, a film trap, a film gate assembly movable toward or away from said film trap, two rods on which said assembly is slidable, said assembly being provided with two arms straddling one of said rods, a screw to move the free ends of said arms toward each other to cause said arms to engage the opposite sides of the rod which they straddle, a member contacting said screw to prevent the rotation of said screw, and means to press said member into contact with the screw.

6. In a moving picture machine, a film trap, a film gate assembly movable toward or away from said film trap, two rods on which said assembly is slidable, one of said rods being provided with flat sides, arms carried by said assembly and contacting said flat sides of said rod and means to adjust said arms relatively to said flat sides.

7. In a moving picture machine, a film trap, a film gate assembly movable toward or away from said film trap, two rods on which said assembly is slidable, means to move said assembly on said rods and means to prevent wobbling of said assembly relative to said film trap, said last named means consisting of two arms on opposite sides of one of said rods, said arms forming a part of said assembly, a headed screw loosely passing through one of said arms and having the head of the screw in engagement with the outer surface of said arm, the screw having threaded engagement with the other arm so that by rotating the screw the two arms may be accurately adjusted relative to their rod.

8. In a moving picture machine, a film gate assembly, a rod on which said assembly is slidable, a shaft journaled in said assembly, a lever secured to said shaft whereby said shaft may be partially rotated, a fixed rack and a segmental gear extending from said shaft and movable therewith, said gear and said lever extending in opposite directions from said shaft, said gear meshing with said rack whereby when the lever is operated the assembly will be moved longitudinally of said rod.

9. In a moving picture machine, a film gate assembly, a rod on which said assembly is slidable, a shaft slidably mounted in said assembly, a lever and a segmental gear extending in opposite directions from said shaft, a rack engaged by said gear whereby when the lever is shifted said assembly will be moved forwardly or rearwardly on said rod, a projection carried by said lever, said assembly being provided with a notch into which said projection will project when the assembly is moved into its adjusted position and a spring acting on said shaft to move said projection into said notch when the projection is brought into alignment with the notch.

10. In a moving picture machine, a film trap, a film gate assembly, a rod on which said assembly is slidable, a shaft slidably mounted in said assembly, a lever and a segmental gear extending in opposite directions from said shaft, a rack engaged by said gear whereby when the lever is shifted said assembly will be moved forwardly or rearwardly on said rod into and out of engagement with the film trap, a projection carried by said lever, said assembly being provided with a notch into which said projection will project when the assembly is moved into its adjusted position so as to contact said film trap and a spring acting on said shaft to move said projection into said notch when the projection is brought into alignment with the notch.

11. In a moving picture machine, a film gate assembly, a rod on which the assembly is mounted, a bearing carried by said assembly, a shaft rotatable in said bearing, a segmental gear and a manually operatable lever projecting in opposite directions to said shaft and secured thereto, a rack with which said gear meshes, said lever being shiftable to either of two extreme positions so as to move said assembly on said rod, and means to resiliently hold said assembly in either of its two positions.

12. In a moving picture machine, a film gate assembly, a rod on which the assembly is mounted, a bearing carried by said assembly, a shaft rotatable in said bearing, a segmental gear and a manually operatable lever projecting in opposite directions to said shaft and secured thereto, a rack with which said gear meshes, said lever being shiftable to either of two extreme positions so as to move said assembly on said rod, and means to resiliently hold said assembly in either of its two positions, said means including a spring coacting with said shaft.

13. In a moving picture machine, a film gate assembly, a rod on which the assembly is mounted, a bearing carried by said assembly, a shaft rotatable in said bearing, a segmental gear and a manually operatable lever projecting in opposite directions to said shaft and secured thereto, a rack with which said gear meshes, said lever being shiftable to either of two extreme positions so as to move said assembly on said rod, a plate forming a part of said assembly and provided with two notches corresponding to the extreme forward and rear positions into which said assembly may be shifted, a projection carried by said lever and means to urge said projection into either of said notches when the projection is brought into alignment with either of said notches to hold said assembly in either of its adjusted positions.

14. In a moving picture machine, a film gate assembly, a rod on which the assembly is mounted, a bearing carried by said assembly, a shaft rotatable in said bearing, a segmental gear and a manually operatable lever projecting in opposite directions to said shaft and secured thereto, a rack with which said gear meshes, said lever being shiftable to either of two extreme positions so as to move said assembly on said rod, a plate forming a part of said assembly and provided with two notches corresponding to the extreme forward and rear positions into which said assembly may be shifted, a projection carried by said lever and means to urge said projection into either of said notches when the projection is brought into alignment with either of said notches to hold said assembly in either of its adjusted positions, said means including a spring to urge said lever toward said plate.

ALBERT KINDELMANN.